(12) United States Patent
Bobba et al.

(10) Patent No.: US 8,824,655 B2
(45) Date of Patent: Sep. 2, 2014

(54) ROUTING INBOUND COMMUNICATIONS ACROSS CALL CENTERS AND THE LIKE

(75) Inventors: Ramesh Bobba, Fremont, CA (US);
Mukesh Sundaram, San Jose, CA (US);
Prem Uppaluru, Cupertino, CA (US);
Gaya Vukkadala, San Jose, CA (US);
Arnab Mishra, Burlingame, CA (US)

(73) Assignee: Transera Communications, Inc., Sunnyvale, CA (US)

( * ) Notice: Subject to any disclaimer, the term of this patent is extended or adjusted under 35 U.S.C. 154(b) by 298 days.

(21) Appl. No.: 13/087,270

(22) Filed: Apr. 14, 2011

(65) Prior Publication Data
US 2011/0255553 A1    Oct. 20, 2011

Related U.S. Application Data

(63) Continuation-in-part of application No. 12/794,277, filed on Jun. 4, 2010, which is a continuation of application No. 11/285,599, filed on Nov. 22, 2005, now Pat. No. 7,738,646.

(60) Provisional application No. 60/630,851, filed on Nov. 23, 2004.

(51) Int. Cl.
*H04M 7/00* (2006.01)
*H04M 3/00* (2006.01)

(52) U.S. Cl.
USPC ............ 379/220.01; 379/221.01; 379/265.01; 379/265.06; 379/266.01

(58) Field of Classification Search
CPC ..................... H04L 65/1096; H04L 29/06027; H04L 65/1053; H04M 3/5175; H04M 3/5233; H04M 3/51; H04M 3/5232; H04M 3/5237; H04M 2203/404; H04M 3/2281; H04M 3/42323; H04M 3/50

USPC ............ 379/265.01, 265.02, 265.11, 266.01, 379/266.02, 220.01, 221.01
See application file for complete search history.

(56) References Cited

U.S. PATENT DOCUMENTS 5,452,350 A   9/1995 Reynolds et al.
5,590,188 A  12/1996 Crockett
(Continued)

FOREIGN PATENT DOCUMENTS

WO   99/13635 A   3/1999
WO   99/66699 A  12/1999
WO   02/35804 A   5/2002

OTHER PUBLICATIONS

Transera Communications, International Application No. PCT/US2005/042324; International Search Report and Written Opinion.

Primary Examiner — Oleg Asanbayev
(74) Attorney, Agent, or Firm — Ascenda Law Group, PC

(57) ABSTRACT

Communications within a communication management network are routed according to a dynamic scorecard routing method in which communication routing decision attributes of communication route destinations are monitored through data feeds from the communication route destinations at a communication router. Values of the communication routing decision attributes are processed to produce processed attribute values and these processed attribute values are stored in a scorecard routing database. Thereafter, upon receipt of an indication of an inbound communication, a call controller is instructed to route the inbound communication to one of the communication route destinations according to assessed scores of the communication route destinations compiled using the processed communication routing decision attribute values stored in the scorecard routing database.

14 Claims, 7 Drawing Sheets

(56) References Cited

U.S. PATENT DOCUMENTS

| | | |
|---|---|---|
| 5,940,496 A | 8/1999 | Gisby et al. |
| 6,011,844 A | 1/2000 | Uppaluru et al. |
| 6,246,752 B1 | 6/2001 | Bscheider et al. |
| 6,389,400 B1 * | 5/2002 | Bushey et al. ............... 705/7.14 |
| 6,744,878 B1 | 6/2004 | Komissarchik et al. |
| 7,412,038 B2 | 8/2008 | Creamer et al. |
| 2003/0086557 A1 * | 5/2003 | Shambaugh et al. .... 379/266.07 |
| 2004/0133641 A1 | 7/2004 | McKinnon et al. |
| 2006/0222164 A1 * | 10/2006 | Contractor et al. ...... 379/265.05 |
| 2008/0008309 A1 * | 1/2008 | Dezonno et al. ......... 379/265.02 |

\* cited by examiner

|  | Route Destination₁ 312 | Route Destination₂ 314 | Route Destination₃ 316 |
|---|---|---|---|
| ATTRIBUTE (INCLUSION CRITERIA) 604₁ | | | |
| ATTRIBUTE (EXCLUSION CRITERIA) 604₂ | | | |
| ATTRIBUTE (Scorecard Attribute) 604₃ | | | |
| ATTRIBUTE (Scorecard Attribute) 604₄ | | | |
| ATTRIBUTE (Scorecard Attribute) 604₅ | | | |
| ⋮ | | | |
| ATTRIBUTE (Scorecard Attribute) 604ₙ | | | 608 |

FIG. 6

ROUTING INBOUND COMMUNICATIONS ACROSS CALL CENTERS AND THE LIKE

RELATED APPLICATIONS

This application is a CONTINUATION-IN-PART of U.S. patent application Ser. No. 12/794,277, filed 4 Jun. 2010, which is a CONTINUATION of U.S. patent application Ser. No. 11/285,599, filed 22 Nov. 2005, now U.S. Pat. No. 7,7386,46, issued 15 Jun. 2010, which claims priority to U.S. Provisional Application 60/630,851, filed 23 Nov. 2004, each of which is incorporated herein by reference.

FIELD OF THE INVENTION

The present invention relates generally to controlling the routing of inbound communications to call centers and similar resources and, more specifically, to a scheme of scorecard routing for the management of such communications.

BACKGROUND OF THE INVENTION

As explained in U.S. Pat. No. 7,738,646, customer support systems provide a customer a line of communication to a product or service provider by providing a convenient means for connecting to an enterprise call center that may include an automated service and support system, e.g., an interactive voice response (IVR) system and/or a live service agent. Because an enterprise requires a minimum service quality level to keep their customers happy, these systems require several technical features, such as call load balancing, queuing, system performance report generation, call monitoring, etc. These features are generally implemented by disparate technologies from multiple vendors and are generally expensive to create, run and maintain. Other significant costs include the salaries of service agents and technicians. Hence, in an effort to reduce these costs, outsourcing and/or off-shoring (both to captive and third party service providers) have become prevalent practices among enterprises.

Just as enterprises have moved their customer service business processes to outsourcers, both on- and off-shore, many consumer-oriented businesses have also done so with their sales processes. But the sales process presents special challenges for call center operators that are not necessarily present in the technical support arena. For example, in the context of a sale, callers are typically responding to recently viewed or presented offers and promotions. Some of these calls may be of an impulse nature, or at least may be made during a caller's limited free time and, as such, callers may not tolerate lengthy delays before being connected to a sales agent. In the face of such delays, callers may terminate the call before reaching an agent, resulting in a "call abandon". The sales process is particularly sensitive to call abandons, as each represents a potential loss of revenue.

In order to guard against excessive call abandon rates, enterprises (and/or their call center operators) must generally ensure that there is sufficient staffing at their call centers to avoid losses of revenue. However, the timing of increased call volumes is often driven by factors outside the control of the call center management. This is particularly true if radio and television commercials are the motivating factors for these calls.

The problem is magnified if an enterprise uses multiple call centers to service its sales calls. Typically, long distance (and/or toll-free0 network carriers load balance calls across multiple destinations in a static fashion. Static load balancing does not take into account any performance factors at the various destinations, as there is neither information available to the carrier from an automated call distributor (ACD) at each destination, nor is there a system within the carrier network able to process any such information even if it were available.

SUMMARY OF THE INVENTION

In various implementations the present invention provides for communications within a communication management network to be routed according to a dynamic scorecard routing procedure. Communication routing decision attributes of communication route destinations are monitored through data feeds from the communication route destinations at a communication router. Values of the communication routing decision attributes are processed to produce processed attribute values and these processed attribute values are stored in a scorecard routing database. Thereafter, upon receipt of an indication of an inbound communication, a call controller is instructed to route the inbound communication to one of the communication route destinations according to assessed scores of the communication route destinations compiled using the processed communication routing decision attribute values stored in the scorecard routing database.

BRIEF DESCRIPTION OF THE DRAWINGS

The present invention is illustrated by way of example, and not limitation, in the figures of the accompanying drawings, which illustrate various embodiments of the present invention.

FIG. 6 illustrates an example of a scorecard routing table as may be maintained in a scorecard routing database in accordance with embodiments of the present invention.

DETAILED DESCRIPTION

Figure 1A:
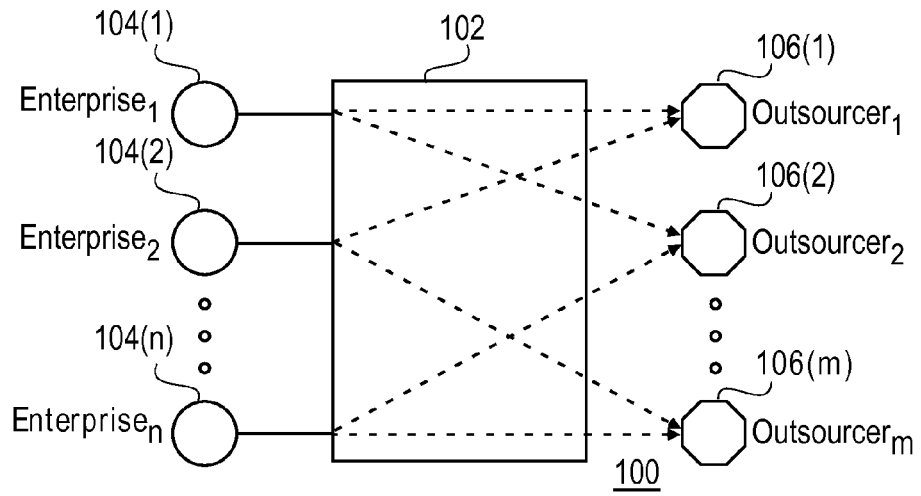
FIG. 1A illustrates connectivity of multiple enterprises to multiple outsourcers through a call management system configured according to one embodiment of the present invention.

The present invention provides systems and methods for an enterprise to control the routing of inbound communications destined for offshore (international) and/or onshore (national) call centers and similar destinations. In various implementations, the inbound communications may be telephone calls, instant message chats, e-mails, etc. All route destinations for these communications are evaluated across a set of attributes, through a scoring process, the route destination with the best aggregate score for a subject communication is selected as the destination for that communication, and the communication is dispatched to the selected destination. The process of scoring, weighting and computing the route destination based on various available attributes is referred to herein as dynamic scorecard routing.

For simplicity, some examples provided herein discuss managing one call, however, it may be appreciated that the present methods and systems may be used to manage a plurality of incoming communications distributed among a plurality of domestic and international call centers via a plurality of domestic and international points of presence (POPs) communicatively coupled to a plurality of data centers. Further, several examples of monitored attributes will be described. However, the present inventors recognize that, from a business perspective, any and all factors that can raise the revenue intake in the sales process are interesting. Similarly, factors that can raise loyalty in a customer service process are interesting. Thus, the examples of attributes described below are not intended to be limiting and regardless of the attribute(s) that is (are) maximized, the process of maximizing involves delivering a currently best suited resource to handle the inbound communication (or set of inbound communications), be it (they) a call(s), chat(s), e-mail(s), or other form of communication.

As used herein, the term scorecard is intended to refer to a table, with the rows of the table representing comparative attributes and the columns of the table representing the alternatives being compared. In the cells of the table are the scores associated with the respective attributes for the corresponding alternatives. A dynamic scorecard is one in which the values of the attributes change constantly, and continuous reevaluation is necessary. In the context of the present invention then, the scorecard is a table of route destinations (e.g., the various call centers, ACDs, or even individual agents being compared with one another for purposes of making communication routing decisions) reflected in the individual columns, with the rows of the individual columns being the attributes of the destinations under consideration. These attributes may be pre-defined by a user (and different users may select different attributes for consideration depending upon their individual business considerations), and the values of the attributes may be computed from data feeds (which may be real-time or non-real-time data feeds) associated with each of the destinations for which routing decisions are being made.

The data feeds from each destination are provided to attribute-specific transformers that then create the actual data values used to populate the cells of the dynamic scorecard, each attribute-specific transformer being associated with a respective attribute for the subject routing destination. Routing a communication using the dynamic scorecard then involves arriving at a composite score for each route destination reflected in the scorecard, and achieving a relative distribution of active communications across the route destinations according to the ratios of these composite scores.

Before describing the dynamic scorecard routing process in further detail, it is helpful to describe examples of environments in which the process operates. In these examples the term 'call' will be used to refer to telephone calls, however, it should be understood that the methods and apparatus are equally applicable to other forms of communication, such as chats, e-mails, and the like; therefore, the term call should be read to be inclusive of such forms of communication.

FIG. 1A illustrates an example of an environment in which the present invention finds application. In system 100, connectivity of multiple enterprises 104(1)-104(n) to multiple outsourcers 106(1)-106(m) is provided through a call management system 102, according to call routing methods provided by present invention. As illustrated, an enterprise such as enterprise 104(1) may have calls routed to more than one outsourcer, such as outsourcers 106(1) and 106(2). In this example, enterprise 104(1) needs to manage the flow of calls and corresponding call data to optimize efficiency. Outsourcer call management consists of measuring and assessing key real time and historical metrics and comparing performance across outsourcers to optimize call routing in line with their service levels. For example, some common metrics are average call handling time, average queue time, and service level, which is defined as the percentage of calls being handled within defined time limits. Enterprises therefore may be able to utilize the call management system 102 to measure and assess their subset of calls when coupled to multiple outsourcers.

In other cases, an outsourcer may be coupled to and service more than one enterprise. For example, enterprise 104(1) and enterprise 104(2) may each utilize outsourcer 106(1). Therefore, call management system 102 must provide the outsourcer 106(1) with specific data and/or control to separately manage each enterprise's data (e.g., call data) to ensure enterprise data is protected (e.g., kept confidential/isolated) and each enterprise receives the appropriate service level.

Figure 1B:
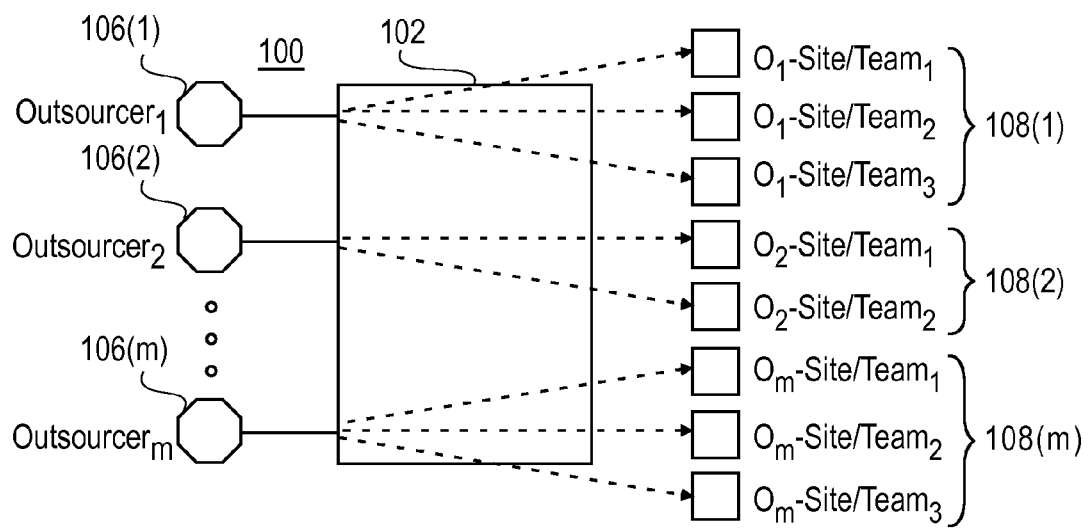
FIG. 1B illustrates multiple outsourcers utilizing a call management system configured in accordance with an embodiment of the present invention to distribute calls in real time across their respective sites and teams.

FIG. 1B illustrates multiple outsourcers 106(1)-106(m) utilizing the call management system 102 to distribute calls in real time across their respective sites and teams 108(1)-108(m) to globally optimize their resources and to provide visibility to their enterprise customers for account management and contract compliance. All features and functions of the call management system 102 arc available to each outsourcer 106(1)-106(m) to address each associated enterprise's (e.g., such as enterprises 104(1)-104(n) discussed above with reference to FIG. 1A) respective requirements.

Figure 2:
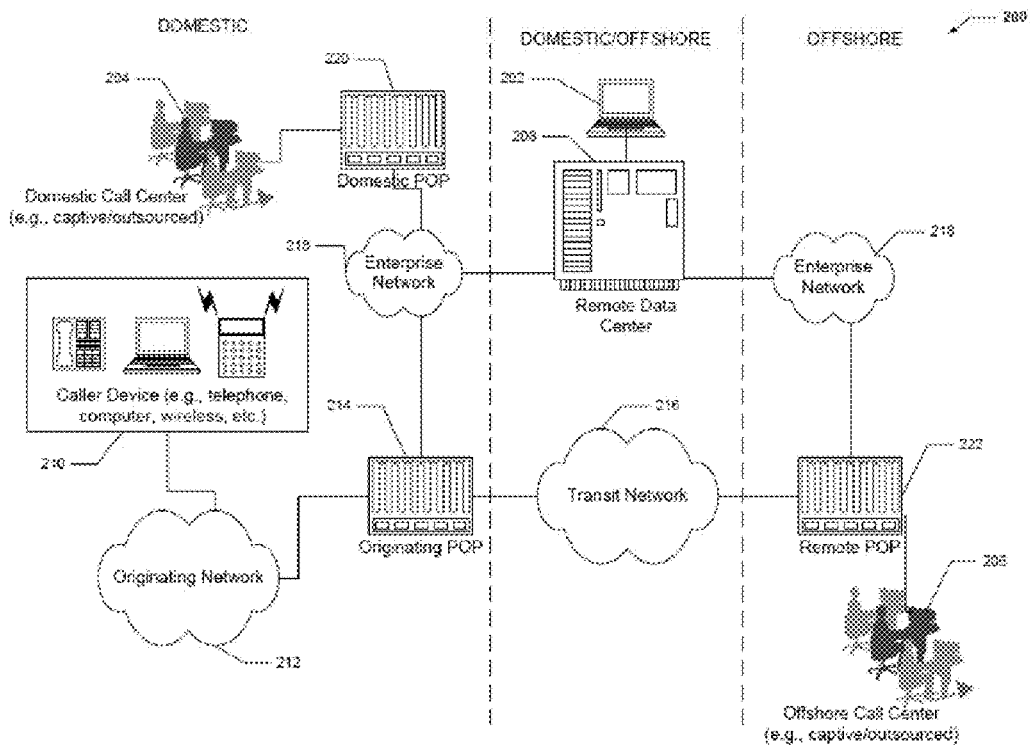
FIG. 2 illustrates a multi-source call management system configured according to one embodiment of the invention.

FIG. 2 illustrates an example of a call management system 200 in which embodiments of the invention may be deployed. Call management system 200 may provide a user (e.g., an enterprise call manager) visibility to incoming calls received at domestic and offshore call centers 204 and 206, respectively, through a terminal 202 communicatively coupled to a remote data center 208. These call centers may be operated by the enterprise (captive) and/or outsourced to third party call center providers.

Generally, a call originates domestically from a caller device 210, such as a telephone, computer, wireless, or other communication device. For example, a caller may wish to reach customer support for a product through a customer support phone number or an Internet site utilizing a contact feature such as live chat. The call is placed through network 212 and is received at an originating POP 214. The network may be a telephone network (e.g., a long distance carrier network), the Internet, or other voice and/or data network. As shown, the originating POP may be connected to a transit network 216 (which may be the same, at least in part, as the originating network) and an enterprise network 218 (which may be a virtual private network over a network such as the originating network, or another network such as a wide area network) or other network that may provide remote connectivity to the remote data center 208. The enterprise network 218 may also provide remote data center 208 connectivity to a domestic POP 220 and a remote POP 222, each of which are communicatively coupled to the domestic call center 204 and offshore call center 206, respectively. However, in varying embodiments, it may be the case that the enterprise network 218 communicatively coupled to each POP may be more than one network or network type (e.g., networks having different protocols, physical connectivity, etc.). Further, the functions of POPs 214, 220 and/or 222 may be collapsed within a single POP or a single domestic POP and single international POP, etc.

The remote data center 208 may receive incoming call data from the originating POP 214 and call center data from the remote POP 222 through the transit network 216 and the enterprise network 218, respectively. The remote data center 208 may then process the received data to determine call parameter data, such as optimum call routing based on monitored attributes at various call centers (e.g., according to the dynamic scorecard routing procedures of the present invention), for example, call load, call type (e.g., customer service, account information, etc.), and call format (e.g., packet type, Internet protocol, etc.). The call may then be connected through the transit network 216 from the originating POP 214 to the remote POP 222 or domestic POP 220 to the offshore or domestic call centers 206, 204, respectively, based upon the processed call parameters.

Once connected, the user may remotely monitor (via terminal 202) the progress of incoming calls through the remote data center 208. Terminal 202 may be local to the remote data center 108 or may be remote and connected via a communications network, such as the Internet or a dedicated data line (not shown). Monitoring may include passive and active functions, such as real-time call reporting, call transferring between call centers (e.g., international and domestic), listening in on a call between the agent and/or customer, recording a call, and queuing a call until a remote agent becomes available.

Figure 3:
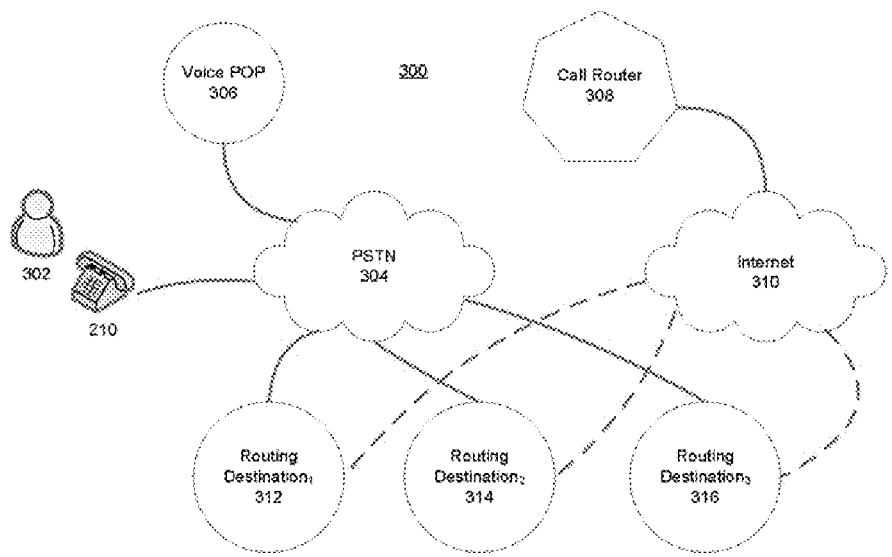
FIG. 3 a different view of a call management system configured in accordance with an embodiment of the present invention.

FIG. 3 presents a different view of a call management system configured in accordance with an embodiment of the present invention. In this example of a call routing system 300, a caller 302 places a call to receive service. This call is routed by the public switched telephone network (PSTN) 304 (which is an example of an originating network) to a voice POP 306 that communicates with a call router 308 via the Internet 310, or other network, to indicate the arrival of a new call. The call router 308 is provided with data feeds from each of several route destinations designated as Route Destination$_1$ 312, Route Destination$_2$ 314 and Route Destination$_3$ 316. The route destinations may be call centers, such as call centers 204 and 206, or ACDs, PBXs, workgroups or agents within either or both of the call centers, for example.

The data feeds provided to the call router 308 ay be real-time or non-real-time data feeds and may be provided asynchronously from one another so as not to overwhelm any bandwidth constrained communication links. The data feeds provide information concerning monitored attributes at each of the route destination and are processed by components of the call router 308 to enable dynamic selection of one of the route destinations (312, 314 or 316) as the selected destination for the newly arrived call. In the mean time, the new call may be held in the voice POP 302, and the caller may optionally receive automated messaging or servicing through an IVR system. When the route destination for the call has been selected, the call router 308 instructs the voice POP 306 to extend or transfer the call to the selected destination. Voice POP 306 is an example of an originating POP 214 shown in FIG. 2 and the functions of call router 308 may be provided in the remote data center 208.

Figure 4:
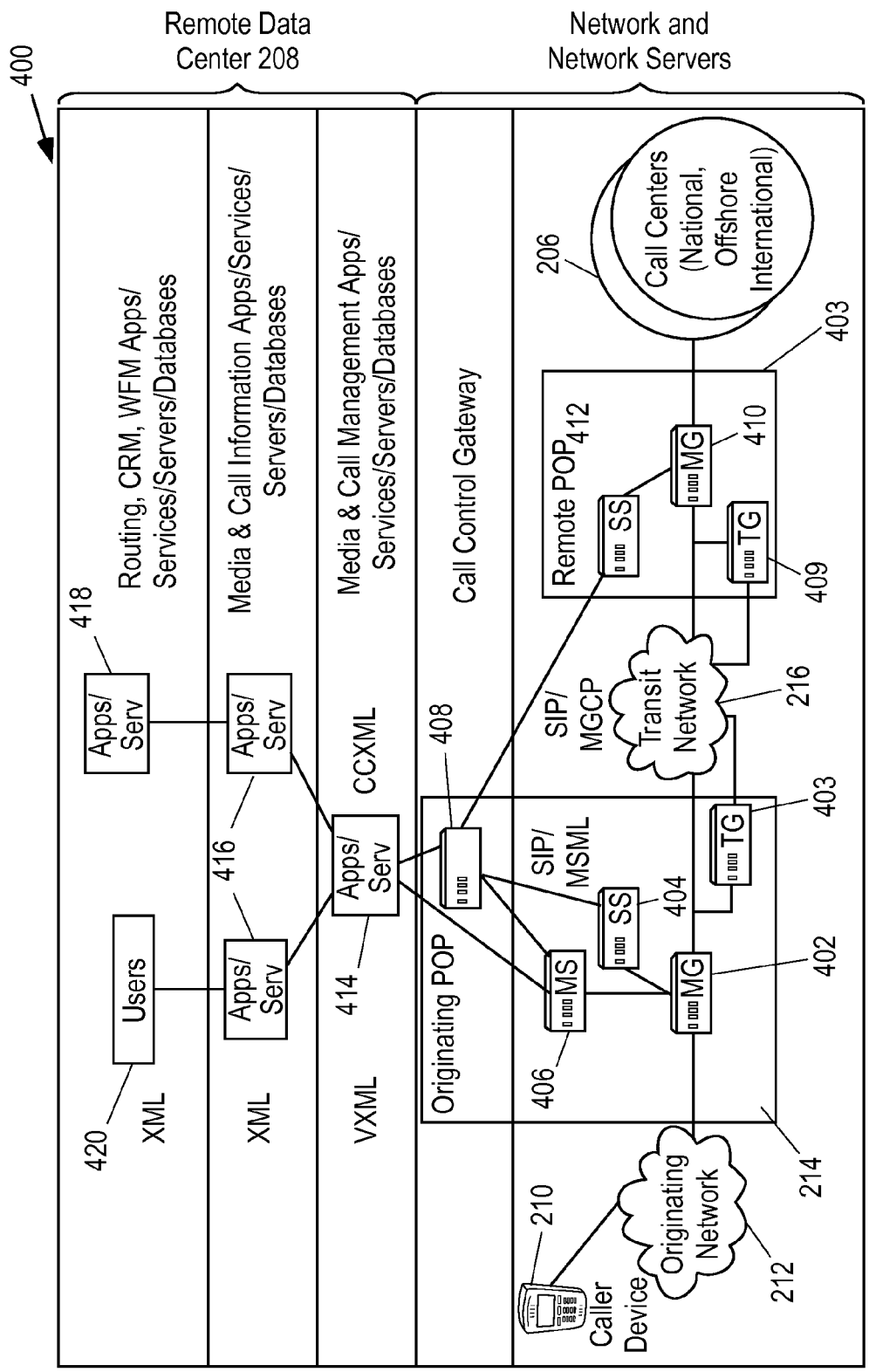
FIG. 4 illustrates equipment, services, and applications that may be associated with the data center and originating and remote POPs.

FIG. 4 further illustrates aspects of a call management system 400, and more specifically, equipment, services, and applications that may be associated with the remote data center 208 and originating and remote POPs 214 and 222, respectively. The enterprise network 218 has been omitted for clarity, as has the domestic POP 220 that may have substantially similar equipment to that of the remote POP 222 or which may be collapsed into originating POP 214.

As shown in the illustration, the originating network 212 (e.g., PSTN 304) may deliver an incoming call from caller device 210 to the transit network 216 (which may likewise be PSTN 304) through the originating POP 214. The originating POP 214 may include a media gateway 402, signaling server 404, media server 406, and a call control gateway 408. Media gateway 402 is used to terminate the inbound call. Among various embodiments, the transit network 216 may use a mesh network implemented between trunking gateways, such as trunking gateways 403 and 409, that compress the phone calls which ingress from the originating network 212 to the media gateway 402 and egress towards the remote POP 222 through media gateway 410 and subsequently to the call centers 206 where the call may be terminated into an ACD (automatic call distributor) or PBX (private branch exchange). Alternatively, the call may be transferred out of the originating POP 214 to a domestic call center 204, either through a domestic POP 220 or directly from the originating POP 214.

The media gateway 402 receives the call and the dialed number from the carrier. It may also receive the calling party ID (identification) as an ANI (automatic number identification). The call control gateway 408 may use a signaling protocol, such as Session Initiation Protocol (SIP) to initially set up and manage the incoming call. Specifically, the call control gateway 408 communicates with the signaling system 404 of the originating POP 214, the signaling system 412 of the remote POP 222, and the remote data center 208 to determine proper call routing through the transit network 216 and remote POP 222. The remote POP 222 may also include a media gateway 410 to reformat the incoming call from the transit network to a format compatible with the call center 206. In one embodiment, the signaling system 404 is configured to signal a primary signaling system, such as call control gateway 408, and a secondary signaling system, such as the (actual) signaling system 412, in order to complete the call. This permits call completion using the secondary signaling system if there are any failures at the call control gateway 408. As the primary signaling controller, the call control gateway 408 participates in all the signaling.

The remote data center 208 may include various servers for running applications and services. For example, media and call management applications 414 may be configured to provide incoming call services through the call control gateway 408 and/or the media server 406. These services may be provided using protocols such as CCXML (call control extensible markup language) and VXML (voice XML), respectively. Some exemplary services include, but are not limited to, call routing and transfer services through the call control gateway 408 and queuing, call recording, and call monitoring through the media server 406.

The media and call management applications 414 may further be communicatively coupled to call information service 416 via a protocol such as XML. This layer of functionality receives call and event details from the call management applications 414. In some cases, call information applications 416 may use a storage means, such as information servers (not shown) to store received incoming call data in appropriate data stores (e.g., a database) and post process the data to create pre-defined reports and data sets for a requesting party such as a user at terminal 202. The information servers may also store recordings of conversations that are collected by the media and call management applications 414 and correlate them with received incoming call details, such as caller and agent identification, length of calls, etc.

As shown, call information applications 416 may be communicatively coupled to enterprise applications 418. Enterprise applications 418 may include algorithms for processing and communicating data, such as call routing and load balancing according to enterprise-specific criteria. Further, the call information applications 416 may perform media conversions (e.g., VXML-to-XML), if necessary, to incoming call data and/or call center data to facilitate communication with a platform 420 associated with the user. Platform 420 may include various communication devices configured to communicate between the aforementioned servers and applications. For example, a web browser may be configured to provide a user connectivity, visibility, and control to/of the various data and controls of the call management system through one or a combination of the Internet, local area network(s), or wide area network(s). Such visibility and control may include the display of real time call event data (e.g., listening to an active call, etc.), overall system and subsystem (e.g., individual servers, gateways, and applications) performance, and access to controls affecting system performance algorithms, such as those responsible for call routing, load balancing, and work force management.

Figure 5:
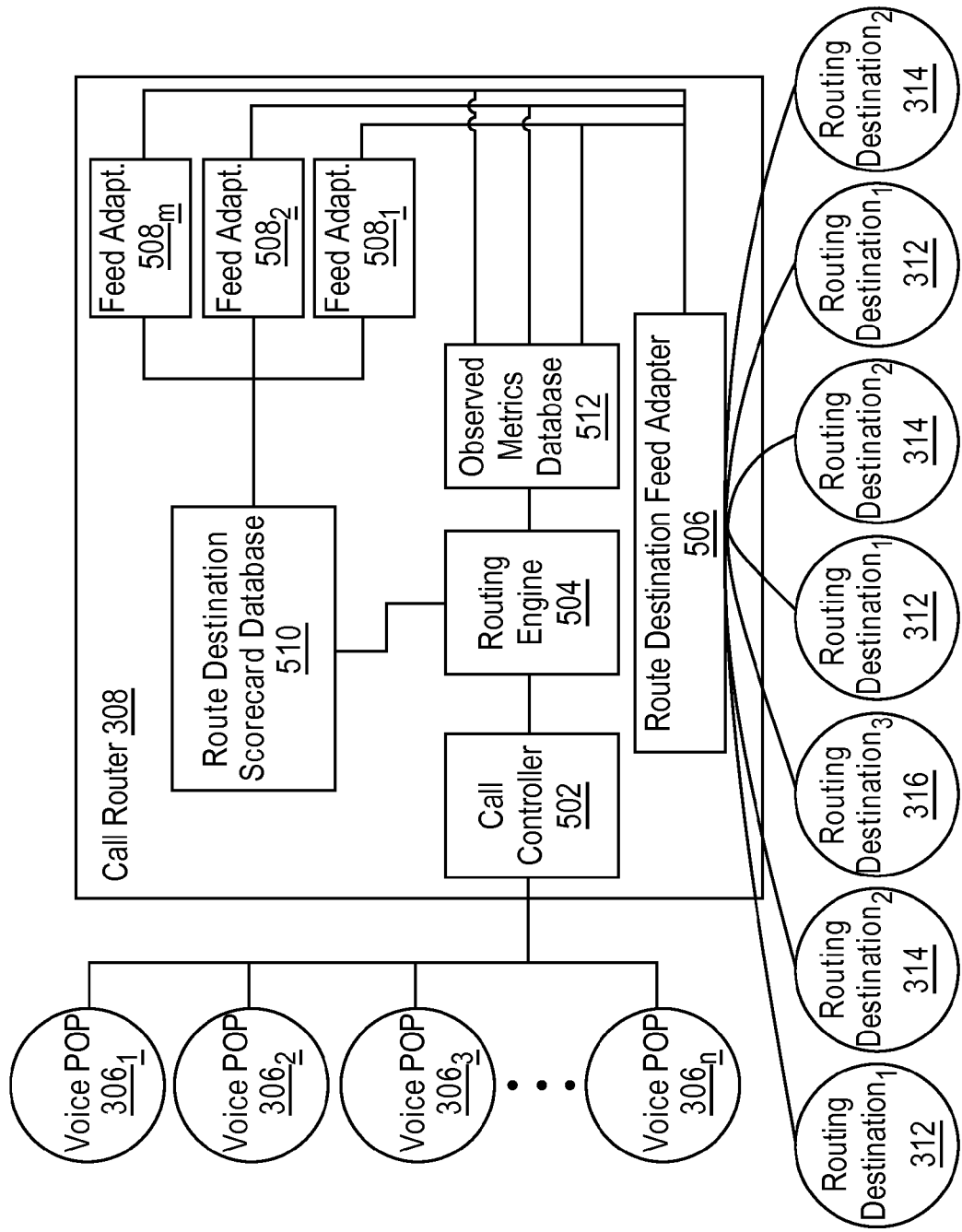
FIG. 5 depicts further details of a call router discussed in connection with FIG. 3.

FIG. 5 depicts further details of the call router 308 discussed in connection with FIG. 3. it should be noted that the call router 308 may be a component of the remote data center 208, for example may, in part, be an application 414 running on a processor of the remote data center and, as such may be instantiated as computer-executable instructions stored on a computer-readable storage medium of the remote data center. In some cases, the feed adapters may be firmware-configured hardware elements or may be software executed by a processor and stored on the computer-readable storage medium.

As discussed above, a call from the PSTN that is routed to a voice POP $306_1$-$306_n$ is indicated to the call router 308, and specifically to a call controller 502, which requests a route from the routing engine 504. The routing engine is configured to provide a route destination for the incoming call to be routed to according to the scorecard routing procedures of the present invention. In order to make this determination, data feeds are collected from routing destinations 312, 314 and 316 (in some instances more than one feed may be gathered from a single routing destination, as shown) by a route destination feed adapter 506. The data feeds include a number of destination-specific attribute values, which are separated by the route destination feed adapter 506 and passed through a plurality of feed adapters $508_1$, $508_2$, . . . $508_m$. The individual feed adapters process the attribute values to normalize them and store them in a route destination scorecard database 510. The routing engine consults the route destination scorecard database and provides a routing decision to the call controller 502, which controls the actual routing of the phone call at the voice POP. The routing engine may also provide a set of data values to an observed metrics database 512, which are also fed back into the feed adapters for storage in the scorecard database 510.

FIG. 6 illustrates an example of a scorecard routing table 600 as may be maintained in a scorecard routing database 510 in accordance with embodiments of the present invention. The rows 602 of table 600 represent attributes $604_1$-$604_n$ of the route destinations being monitored through the data feeds discussed above. The columns 606 of the table 600 represent the alternative destination routes 312, 314, 316, being compared. In the cells 608 of the table are the scores associated with the respective attributes for the corresponding alternative routes. Because the values of the attributes change constantly, the scorecard is said to be dynamic in nature and continuous reevaluation is necessary as each new call is received. Note that the route destinations may be the various call centers, ACDs, PBXs, agent workgroups, or even individual agents being compared with one another for purposes of making communication routing decisions. The attributes monitored via the data feeds may be pre-defined by a user (e.g., via terminal 102) and different users may select different attributes for consideration depending upon their individual business considerations. The values of the attributes may be computed from the data feeds (which may be real-time or non-real-time data feeds) associated with each of the destinations for which routing decisions are being made and may be normalized so as to make routing computations easier.

The data feeds from each destination are provided to the attribute-specific feed adapters that then create the actual data values used to populate the cells of the dynamic scorecard; each attribute-specific feed adapter being associated with a respective attribute for a subject routing destination or for a common attribute across multiple destinations. Routing a communication using the dynamic scorecard then involves the routing engine arriving at a composite score for each route destination reflected in the scorecard, and achieving a relative distribution of active communications across the route destinations according to the ratios of these composite scores.

Figure 7:
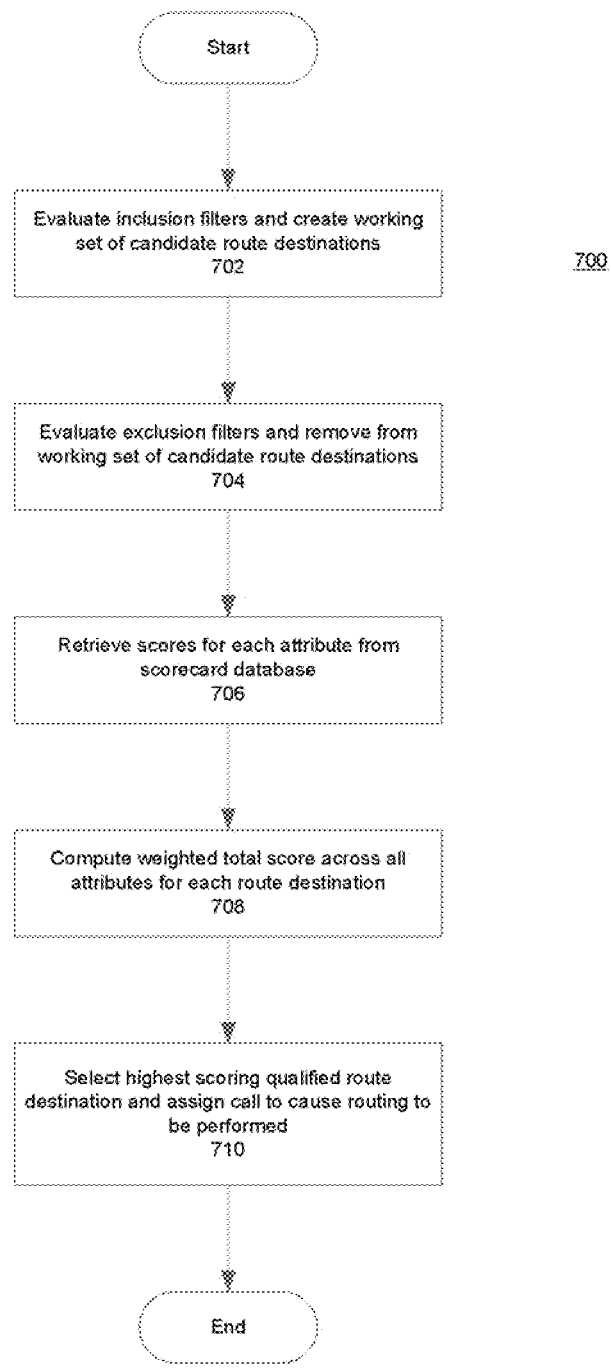
FIG. 7 illustrates a process of determining a destination route according to a scorecard routing table in accordance with an embodiment of the present invention.

FIG. 7 illustrates a process 700 of determining a destination route according to a scorecard routing table in accordance with an embodiment of the present invention. At 702, the routing engine evaluates a set of inclusion filters and creates a working set of candidate route destinations for a new call. Inclusion criteria are generally contact attributes matched or compared with route destination attributes, with the result determining whether the route destination is appropriate for the contact. An example might be only those route destinations whose aggregate call abandons within the last 30 minutes are less than 10. Note, application of the inclusion criteria is an optional step and in some embodiments of the invention all destination routes are considered for every new communication.

At 704, the routing engine evaluates a set of exclusion filters and removes any route destinations from the working set of candidate route destinations that satisfy the exclusion criteria. Exclusion criteria are similar to inclusion criteria, but trigger the exclusion of specific destinations; e.g., do not route calls to a call center within the same state. Any exclusion criteria may be applied, including no such criteria.

At 706, the individual attribute scores for the remaining candidate route destinations are retrieved from the scorecard database. At 708 these scores are used to compute a weighted total score for each candidate route remaining under consideration, and at 710 the candidate route with the highest score is selected as the route destination for the new communication. Any weighting process may be applied, including one in which all attributes are weighted equally. The destination route is assigned to the communication and the call controller is instructed accordingly so that the call may be routed from the voice POP to the selected destination. In cases of high communication arrival rates, and low rates of feedback data that alter the scorecard database and, hence, the route selection outcome, the routing algorithm must be sensitive to the undesirable phenomenon of "fire-hosing"—i.e., overloading a specific route destination with a barrage of communications. This issue is addressed by using counters of communications routed to each route destination over a defined interval, which dynamically alters the scorecard by participating as an attribute in the evaluation of the scorecard.

In addition to the above-mentioned processes for determining the scorecard assessment of the best routing destination, other processes can be used. For example, processes that involve normalized comparisons of like metrics, prioritized lists of attributes (e.g., so that if a "score" produced by assessment of a "first" attribute across available routing destinations is not determinative, a score based on a "next" attribute is considered, and so on for a list of prioritized attributes), prioritized and weighted lists of attributes, and so on.

Figure 8:
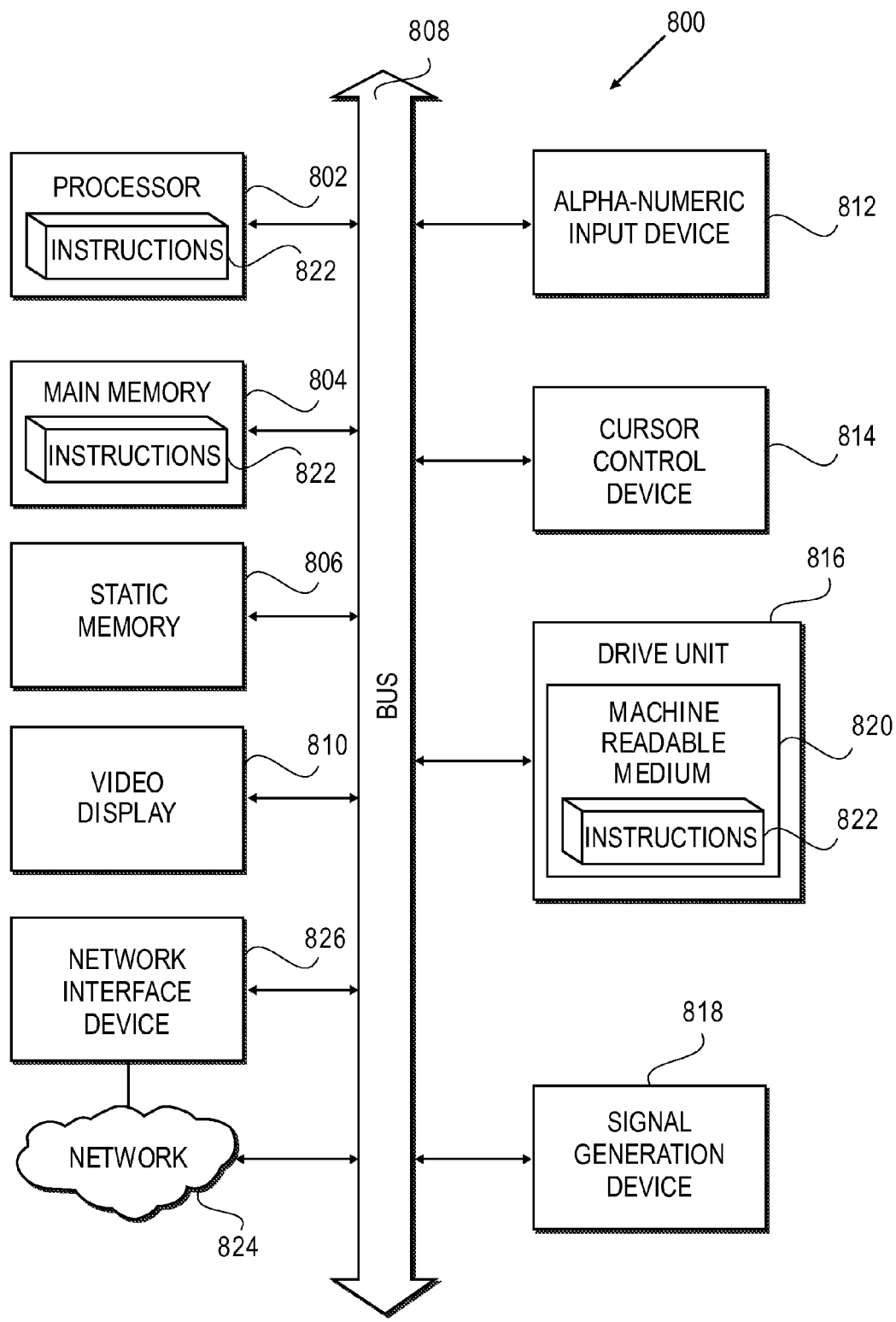
FIG. 8 illustrates a machine in the exemplary form of a computer system within which a set of instructions for causing the machine to perform any one or more of the methodologies discussed herein may be executed.

FIG. 8 illustrates a machine in the exemplary form of a computer system 800 wherein a set of instructions can be executed to cause the machine to perform any one or more of the methodologies discussed herein. Computer system 800 may represent any or all of the data centers, POPs or other devices discussed herein. Further, while only a single machine is illustrated, the term "machine" shall also be taken to include any collection of machines that individually or jointly execute a set (or multiple sets) of instructions to perform any one or more of the methodologies discussed herein.

The exemplary computer system 800 includes a processor 802 (e.g., a central processing unit (CPU), a graphics processing unit (GPU), or both), a main memory 804 and a static memory 806, which communicate with each other via a bus 808. The computer system 800 may further include a video display unit 810 (e.g., a liquid crystal display (LCD)). The computer system 800 also includes an alphanumeric input device 812 (e.g., a keyboard), a cursor control device 814 (e.g., a mouse), a disk drive unit 816, and a signal generation device 818 (e.g., a speaker) and a network interface device 820.

The disk drive unit 816 includes a machine-readable medium 820 on which is stored one or more sets of instructions (e.g., software 822) embodying any one or more of the methodologies or functions described herein. The software 822 may also reside, completely or at least partially, within the main memory 804 and/or within the processor 802 during execution thereof by the computer system 800, the main memory 604, and the instruction-storing portions of processor 802 also constituting machine-readable media. The software 822 may further be transmitted or received over a network 824 via the network interface device 826.

While the machine-readable medium 820 is shown in an exemplary embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any tangible medium that is capable of storing a set of instructions for execution by the machine and that cause the machine to perform any one or more of the methodologies of the present invention. The term "machine-readable medium" shall accordingly be taken to included, but not be limited to, solid-state memories, and optical and magnetic media.

In addition to the scorecard routing methodologies based on call attributes and the like discussed above, other scorecard routing decisions based on other attributes may also be incorporated in accordance with embodiments of the invention. For example, routing decisions based on scoring of the caller, the call centers, and/or individual call center operators (either individually or collectively in lieu of or in addition to the call attributes) may be made. Consider, for example, that an enterprise may want to have its "best" customers services by call centers or even individual call center operators that are deemed to be better than others to which the calls may be directed. Understanding who the caller is (either personally or as classified with a group or customer, for example), together with real time or even historical information regarding the performance or other attributes of call centers and/or call center operators can be used to facilitate such decisions.

For example, much like the call attributes were scored, call centers and individual operators can be scored using a variety of metrics. For example, scoring based on number of calls handled per time period, number of successful call resolutions, number of call escalations to supervisors, number of caller complaints, number of callers satisfied (e.g., as revealed by surveys, etc.) can serve as the basis for determining which centers/operators to assign to which types of calls. Likewise, discerning elements about the callers themselves can be used in connection with routing decisions. High value callers (e.g., those who pay for specified levels of service, etc.) may be assigned to those centers/operators with the highest scores. Callers may be assigned on individuals bases or grouped into classes of callers for such purposes. Indeed, in some cases, high value callers may even be placed in queues having wait times longer than others but which will be services by those centers/operators having the highest scores in order to ensure that the caller(s) receive the best possible service (as measured by, for example, caller satisfaction).

Details about the callers can be obtained in a variety of ways. for example, such details may be associated with calling number databases and retrieved upon recognition of a calling number. Alternatively, or in addition, caller details may be extracted through an automated interactive voice response (IVR) colloquy process before a call is assigned to a center/operator. In some instances, social networking features may be used to discern such call elements. for example, information extracted via the IVR system may be used to perform searches or other look ups of social network databases or other information sources in order to determine information regarding the caller. Then, based on the scoring of the caller, the call centers, the call center operators and/or the call attributes discussed above, calls may be grouped into various groupings and assigned to call centers/operators on that basis.

Thus, systems and methods for controlling the routing of inbound communications to call centers and similar resources and, more specifically, to a scheme of scorecard routing for the management of such communications have been described. It should be appreciated, however, that the foregoing descriptions were intended to be illustrative only and the present invention should be measured only in terms of the claims, which follow.

What is claimed is:

1. A method of routing communications within a communication management network, the method comprising:

monitoring communication routing decision attributes of communication route destinations through data feeds from the communication route destinations at a communication router, the communication routing destinations being at least one of a call center, an agent workgroup, an automated call distributor, and a private branch exchange; wherein the communication routing decision attributes are pre-defined by a user:

processing values of the communication routing decision attributes to produce processed communication routing decision attribute values and storing the processed communication routing decision attribute values in a scorecard routing database; wherein the data feeds from each communication routing destination are provided to attribute-specific feed adapters that then create the processed values communication routing decision attributes used to populate the scorecard routing database; wherein each attribute-specific feed adapter is associated with a respective attribute for a subject communication routing destination;

upon receipt of an indication of an inbound communication, instructing a call controller to route the inbound communication to one of the communication route destinations according to assessed scores of the communication route destinations compiled using the processed communication routing decision attribute values stored in the scorecard routing database; wherein the assessed scores of the communication route destinations comprise scores compiled using prioritized and weighted lists of attributes for the communication route destinations.

2. The method of claim 1, wherein the assessed scores of the communication route destinations comprise weighted cumulative scores of the communication route destinations.

3. The method of claim 1, wherein the assessed scores of the communication route destinations comprise scores compiled using normalized comparisons of like metrics for the communication route destinations.

4. The method of claim 1, wherein the assessed scores of the communication route destinations comprise scores compiled using prioritized lists of attributes for the communication route destinations.

5. The method of claim 1, wherein the scorecard routing database comprises a table in which the communication route destinations are reflected in individual columns of the table, and the communication routing decision attributes of the communication route destinations are reflected in individual rows of the table.

6. The method of claim 1, wherein processing values of the communication routing decision attributes comprises normalizing the values.

7. The method of claim 1, wherein each attribute-specific feed adapter is associated with a common attribute across multiple routing destinations.

8. A call management device, comprising a processor and a computer-readable storage medium coupled to the processor, the computer-readable storage medium storing computer-executable instructions for routing inbound calls received at a point-of-presence (POP), said instructions, when executed by the processor, causing the processor to monitor communication routing decision attributes of communication route destinations through data feeds from the communication route destinations at a communication router, the communication routing destinations being at least one of a call center, an agent workgroup, an automated call distributor, and a private branch exchange; wherein the communication routing decision attributes are pre-defined by a user; process values of the communication routing decision attributes to produce processed communication routing decision attribute values and storing the processed communication routing decision attribute values in a scorecard routing database; wherein the data feeds from each communication routing destination are provided to attribute-specific feed adapters that then create the processed values communication routing decision attributes used to populate the scorecard routing database; wherein each attribute-specific feed adapter is associated with a respective attribute for a subject communication routing destination; and, upon receipt of an indication of an inbound communication, instruct a call controller communicatively coupled to the POP to route the inbound communication to one of the communication route destinations according to assessed scores of the communication route destinations compiled using the processed communication routing decision attribute values stored in the scorecard routing database; wherein the assessed scores of the communication route destinations comprise scores compiled using prioritized and weighted lists of attributes for the communication route destinations.

9. The call management device of claim 8, wherein the assessed scores of the communication route destinations comprise weighted cumulative scores of the communication route destinations.

10. The call management device of claim 8, wherein the assessed scores of the communication route destinations comprise scores compiled using normalized comparisons of like metrics for the communication route destinations.

11. The call management device of claim 8, wherein the assessed scores of the communication route destinations comprise scores compiled using prioritized lists of attributes for the communication route destinations.

12. The call management device of claim 8, wherein the scorecard routing database comprises a table in which the communication route destinations are reflected in individual columns of the table, and the communication routing decision attributes of the communication route destinations are reflected in individual rows of the table.

13. The call management device of claim 8, wherein values of the communication routing decision attributes are normalized.

14. The call management device of claim 8, wherein each attribute-specific feed adapter is associated with a common attribute across multiple routing destinations.

* * * * *